(12) United States Patent
Andonian et al.

(10) Patent No.: US 6,688,645 B2
(45) Date of Patent: Feb. 10, 2004

(54) TURN-LIMITED COLUMN ASSEMBLY

(75) Inventors: Brian James Andonian, Livonia, MI (US); Bing Zheng, Dublin, OH (US); Muqtada Husain, Brownstown, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 107 days.

(21) Appl. No.: 10/109,805

(22) Filed: Mar. 28, 2002

(65) Prior Publication Data

US 2003/0184072 A1 Oct. 2, 2003

(51) Int. Cl.$^7$ .................................................. B62D 1/16
(52) U.S. Cl. ........................ 280/779; 180/6.26; 180/6.6
(58) Field of Search .............................. 280/776, 779; 180/6.26, 6.32, 6.6, 6.36, 6.58, 6.62, 7.2

(56) References Cited

U.S. PATENT DOCUMENTS

| | | | |
|---|---|---|---|
| 2,746,573 A | 5/1956 | Hastings | |
| 3,411,366 A | 11/1968 | Leto | |
| 3,662,610 A | 5/1972 | Thoen | |
| 3,762,523 A | 10/1973 | Thorsby | |
| 4,153,133 A | 5/1979 | Anderson | |
| 4,179,137 A | * 12/1979 | Burke | ......................... 280/775 |
| 4,338,747 A | 7/1982 | Hess et al. | |
| 4,485,371 A | * 11/1984 | Yamada et al. | ............. 340/438 |
| 4,932,511 A | 6/1990 | Ames | |
| 5,010,784 A | 4/1991 | Nakazato et al. | |
| 5,455,397 A | 10/1995 | Havenhill et al. | |
| 5,503,240 A | 4/1996 | Hong | |
| 5,662,003 A | 9/1997 | Ohara | |
| 5,896,942 A | 4/1999 | Bohner et al. | |
| 6,186,547 B1 | * 2/2001 | Skabrond et al. | ........... 280/775 |
| 6,345,842 B1 | * 2/2002 | Igarashi et al. | ............. 280/775 |
| 6,454,486 B2 | * 9/2002 | Kreuzer | ................... 403/374.3 |
| 6,492,807 B2 | * 12/2002 | Spellman | ............... 324/207.22 |
| 6,592,148 B2 | * 7/2003 | Byers et al. | ................. 280/777 |

FOREIGN PATENT DOCUMENTS

JP            2301708        12/1990

* cited by examiner

*Primary Examiner*—Paul N. Dickson
*Assistant Examiner*—Toan To
(74) *Attorney, Agent, or Firm*—Brinks Hofer Gilson & Lione

(57) ABSTRACT

A turn-limited column assembly comprises a column rotatable about an axis. The column rotates a first plate that defines a first spiral track. The first plate rotates relative to a second plate that defines a second spiral track. The plates are arranged such that the spiral tracks overlap to define an intersection, whereat a sliding element is disposed. The column is rotatable between a first stop wherein the sliding element is disposed between the inboard ends of the spiral tracks and a second stop wherein the sliding element is disposed between the outboard ends of the spiral tracks.

11 Claims, 2 Drawing Sheets

TURN-LIMITED COLUMN ASSEMBLY

TECHNICAL FIELD OF THE INVENTION

The present invention relates to a turn-limited column assembly for use in an automotive steering system or the like, and, in particular, to a turn-limited column assembly that utilizes a sliding element disposed in spiral tracks to limit rotation of the column

BACKGROUND OF THE INVENTION

A typical automotive vehicle includes a steering wheel that is rotated by an operator to turn the vehicle wheels and thereby change direction of the vehicle. The steering wheel is mounted on a column that is mechanically coupled to the wheels. The direction of the wheels during turning is limited by mechanical stops. Thus, when the wheels reach a predetermined direction corresponding to a minimum turning radius of the vehicle, the wheels engage the stops. The mechanical coupling prevents the operator from further turning the steering wheel. In this manner, the operator is made aware that the minimum turn radius has been attained.

It has been proposed to utilize a steer-by-wire system that eliminates the mechanical connection between the operator and the vehicle wheels. In order to replicate the driving experience of a typical operator, a steer-by-wire system uses a steering wheel and steering column similar to those found in a mechanically-coupled vehicle. A sensor is operatively coupled to the column and generates an electrical signal in response to rotation of the column. This electrical signal is then transmitted to an electronic actuator, such as a motor, which turns the wheels in a desired direction. Because there is no mechanical coupling, even when the steerable wheels are prohibited from turning, the steering wheel may be rotated. Continued rotation of the steering wheel may cause damage to the sensor. Moreover, the operator is not aware that further rotation of the steering wheel is not effective in turning the vehicle.

One feature of a typical mechanically-coupled system is that the steering wheel rotates more than 360 degrees in each direction when turning the vehicle. In order to replicate the sensitivity of a mechanically-coupled system, it is desired that the operator also be able to rotate the steering wheel in a steer-by-wire vehicle more than 360 degrees. Thus, there is a need for a steering column assembly that is adapted for use in a steer-by-wire system and replicates familiar experience of a mechanically-coupled steering system by permitting the operator to freely rotate the steering wheel more than 360 degrees in each direction, but includes a turn-limiting mechanism that is effective to prevent the steering-wheel from being rotated beyond a point where further rotation is no longer effective in turning the wheels and that may be readily manufactured and incorporated into the steering column assembly without interfering with the steer-by-wire sensor or other components thereof.

SUMMARY OF THE INVENTION

The present invention is a turn-limited column assembly comprising a column rotatable about an axis and a first plate rotatable with the column. The first plate defines a first spiral track having an inboard end and an outboard end. The invention further comprises a second plate disposed to permit rotation of the first plate relative to the second plate. The second plate defines a second spiral track having an inboard end and an outboard end. The plates are arranged such that a section of the first track axially overlies a section of the second spiral track to define an intersection. The first spiral track extends from the intersection toward the inboard end of the first spiral track in a first direction, and the second spiral track extends from the intersection toward the inboard end of the second spiral track in a second direction different from the first direction. A sliding element is disposed at the intersection and is slideable along the first track and the second track. The sliding element, the first spiral track and the second spiral track cooperate to permit rotation between a first stop where the sliding element is disposed at the inboard end of the first track and the inboard end of the second track and a second stop where the sliding element is disposed at the outboard end of the first track and the outboard end of the second track.

DETAILED DESCRIPTION OF A PREFERRED EMBODIMENT

Figure 1:
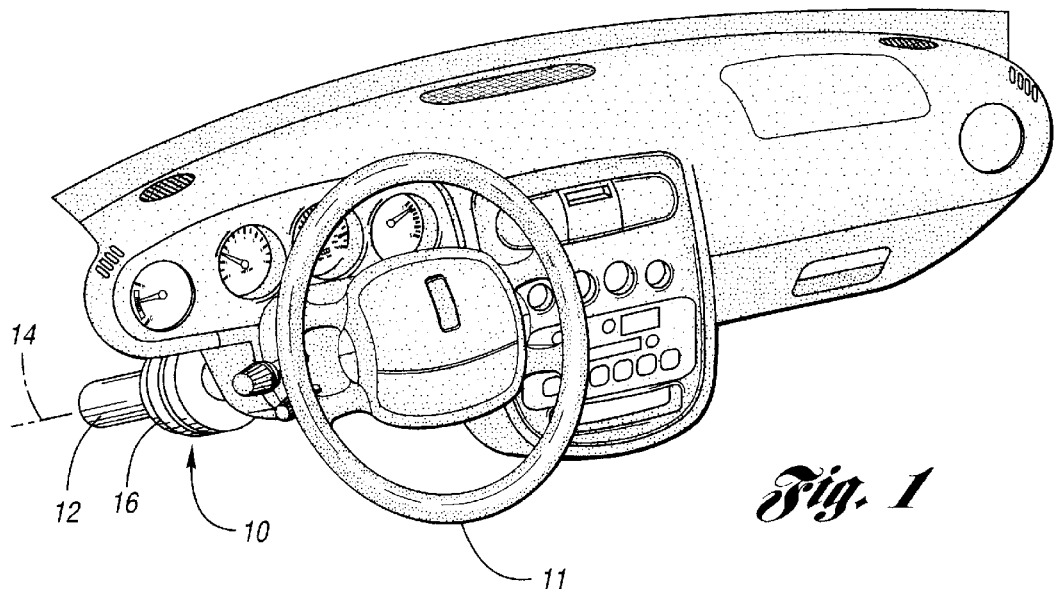
FIG. 1 depicts a portion of a vehicle passenger compartment including a turn-limited steering column assembly in accordance with this invention.
Figure 2:
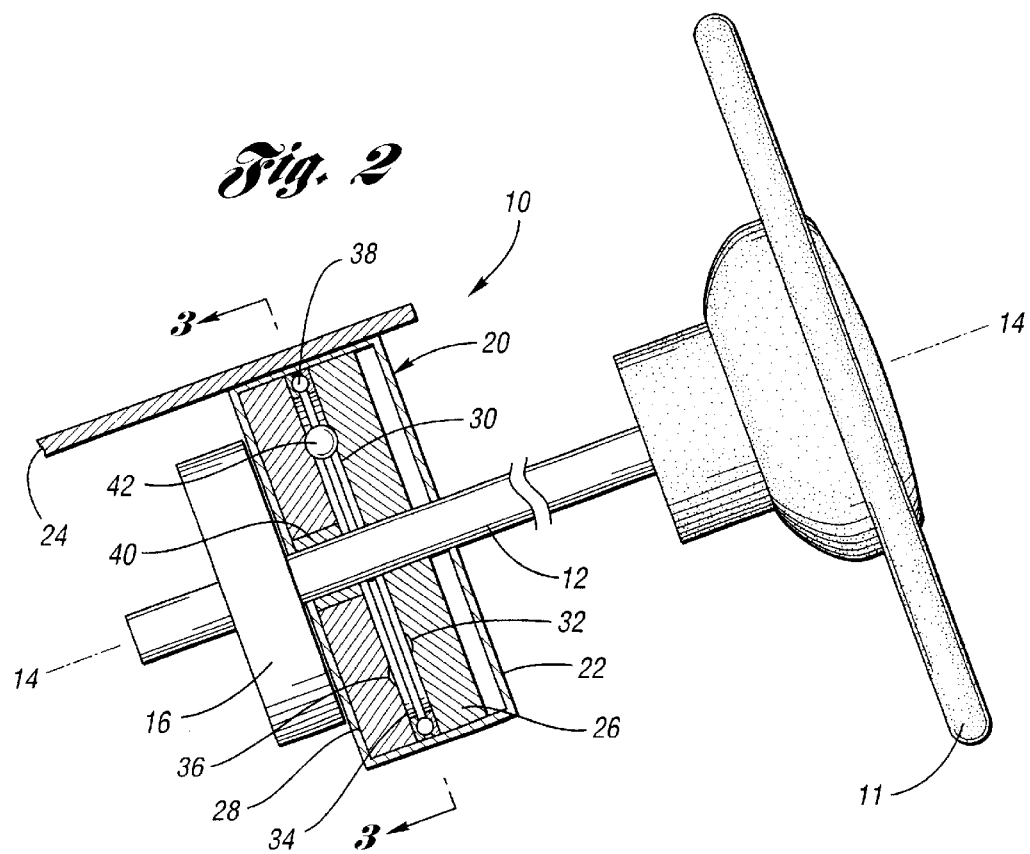
FIG. 2 is a cross-sectional view of a turn-limited steering column assembly as shown in FIG. 1.

In accordance with a preferred embodiment of this invention, referring to FIGS. 1 and 2, there is depicted a turn-limited steering column assembly 10 in an automotive vehicle equipped with a steer-by-wire steering system. Assembly 10 includes a steering column 12 rotatable about an axis of rotation 14. A steering wheel 11 is mounted to one end of column 12 within the passenger compartment of the vehicle for manipulation by an operator in steering the vehicle. Steering column assembly 10 is attached to the chassis of the vehicle by a supporting structure (not shown) that supports column 10 on the vehicle. Assembly 10 may also include components (not shown) useable by an operator during driving, including a transmission shift mechanism and a turn signal mechanism, as well as wiring for additional features, including cruise controls and horn. It is an advantage of the turn-limiting mechanism of this invention that it may be incorporated into steering column assemblies without necessitating changes to the supporting structure or other components thereof.

In a preferred embodiment, a sensor 16 mounted on column 12 generates an electrical signal in response to rotational movement of the column. As is customary for mechanically linked steering system, clockwise rotation of the steering wheel pivots the vehicle wheels to direct the vehicle toward the right, whereas counterclockwise rotation pivots the wheels to direct the vehicle toward the left. A preferred sensor produces a signal dependent upon the angle and torque with which the column is rotated. While in the preferred embodiment this invention is employed in a steer-by-wire system, it is also useful in mechanically linked steering systems to limit rotation of the column without reliance upon mechanical limiters located at the wheels or elsewhere, including in vehicles equipped with power steering systems to limit rotation of the steering column that might otherwise damage the power steering unit or interfere with the operation thereof.

Referring to FIG. 2, in, accordance with this invention, assembly 10 includes a turn-limiting mechanism 20. In this embodiment, mechanism 20 is disposed intermediate steering wheel 11 and sensor 16, but may be disposed in any suitable arrangement, including near the end of column 12 opposite steering wheel 11, with the sensor therebetween. Mechanism 12 includes a housing 22 attached to a section 24 of the chassis and disposed about column 12, such that the column is rotatable relative to the housing. It is a feature of the preferred embodiment that the turn-limiting mechanism is compact and occupies only a limited axial distance about the exterior of the column, so as to be used with the supporting structure or other components of the column assembly. Alternately, mechanism 20 may be attached to a supporting structure for column 12, and may support column 12 within the vehicle in addition to limiting rotation thereof.

Mechanism 20 comprises a first, rotatable plate 26 and a second, fixed plate 28 disposed within housing 22, about column 12. Plate 26 is attached to column 12 and rotates in conjunction with the column about axis 14 freely within housing 22. Plate 26 includes a face 30 that is normal to axis 14 and that faces plate 28. In accordance with this invention, a spiral track 32 is defined by a groove in face 30. Plate 28 is fixed to housing 22 and includes a face 34 that is normal to axis 14 and that faces face 30. Plate 28 further comprises a groove that defines a spiral track 36. Bearings 38 are disposed between face 30 and face 34 to facilitate rotation of first plate 26 relative to second plate 28. A bearing 40 is disposed between column 12 and second plate 28 to facilitate rotation of the column relative to the fixed plate. A sliding element 42, which is a ball bearing in the preferred embodiment, is disposed in the tracks 32 and 36 to limit rotation of rotatable plate 26 relative to fixed plate 28 and thereby limit rotation of column 12 about axis 14, as discussed herein.

Figure 3:
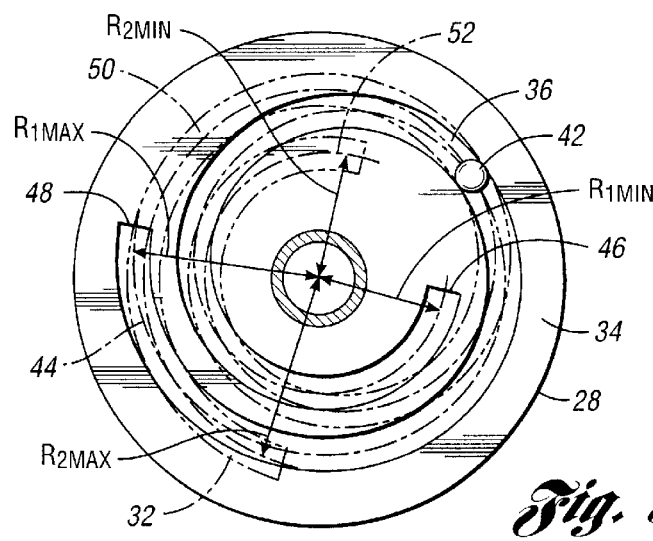
FIG. 3 is a plan view of a plate in FIG. 2 taken along line 3—3 in the direction of the arrows, and showing elements of the turn-limited steering column assembly in a non-turn orientation.

FIG. 3 shows a plan view of face 34 of plate 28, depicting spiral track 36 about axis 14. Track 32 has a substantially constant width about a centerline 44 and extends clockwise between an inboard end 46, located at radius, $R_1$min, and an outboard end 48, at a radius, $R_1$max. As used herein, radius corresponds to the distance between axis 14 and centerline 44. In this embodiment, the angular displacement between the inboard end and the outboard end is 540 degrees. Track 36 extends from the inboard end to the outboard end in a first direction, which is clockwise in the depicted embodiment. Track 32 is preferably a helicoid and, more preferably, an Archimedean spiral. As used herein, an Archimedean spiral is a spiral wherein the change in radius per degree, $\Delta R/\Delta \theta$, is a constant value.

Rotatable plate 26 includes a track 32 on face 30 that is preferably identical in shape to track 36 when viewed directly, but is oriented to face face 34 of plate 28. Referring to FIG. 3, the pattern of track 32 is shown in phantom lines superimposed onto plate 28. As for track 36, track 32 has a substantially constant width about a centerline 50, an inboard end 52 at a radius, $R_2$min, from axis 14, and an outboard end 54 at a radius, $R_2$max from axis 14, wherein radius $R_2$min is equal to $R_1$min and $R_2$max is equal to $R_1$max. In contrast to track 36, track 32 extends from inboard end 52 to outboard end 54 in a direction opposite track 36, that is clockwise in FIG. 3. As a result of the facing arrangement, even though tracks 32 and 36 are identical in shape, there is an overlap of a limited section of the tracks to form an intersection. Sliding element 42 is located at the intersection where track 32 and track 36 overlap. In this embodiment, the angular displacement between inboard end 52 and outboard end 54 is 540 degrees. Track 36 is preferably a helicoid and more preferably an Archimedean spiral, identical to track 32.

As shown in FIG. 3, the arrangement of track 32, track 34 and sliding element 42 are shown in a non-turn position corresponding to a straight direction of the vehicle wherein the vehicle wheels are oriented for travel straight ahead without turning. In this position, the operator may freely rotate the steering wheel in a clockwise or counterclockwise direction to change the direction of the vehicle. To turn left, the operator turns steering wheel 11 counterclockwise to rotate column 12. Sensor 16 detects the rotation of column 12 and generates an electrical signal to cause the vehicle wheels to pivot,counterclockwise to alter the direction of the vehicle for a left turn. Rotation of column 12 rotates plate 26 relative to plate 28. Rotation of plate 26 changes the location of the intersection whereat tracks 32 and 36 overlap. Sliding element 42 slides along the tracks 32 and 36, to remain located at the intersection.

Figure 4:
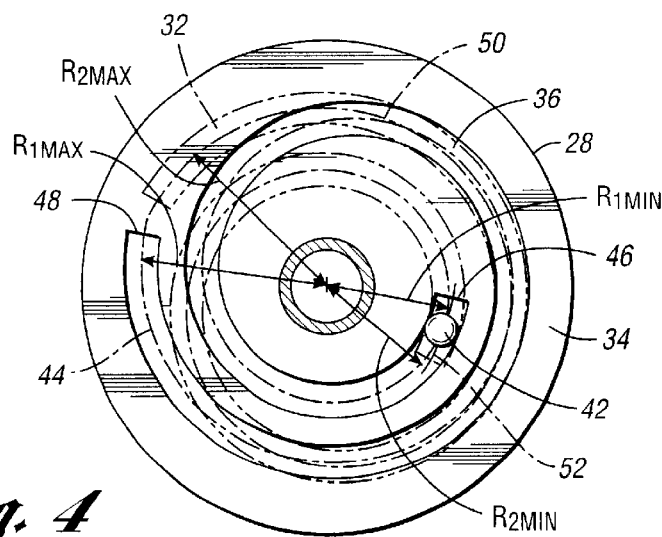
FIG. 4 is a plan view similar to FIG. 3 and depicts a left turn stop orientation.

Continued rotation of the steering wheel is permitted by the operator until the plates are arranged as shown in FIG. 4. In this orientation, sliding element is located at the inboard end 46 of track 32 and the inboard end 52 of track 36 and is stopped from sliding further along the tracks. With the sliding element trapped between the inboard ends in this manner, column 12 is prevented from further counterclockwise rotation, and the operator is prevented from further turning of the steering wheel. Thus, the arrangement shown in FIG. 4 corresponds to a first stop indicative of an extreme left turn rotation of the steering wheel. While the steering wheel is stopped from further counterclockwise rotation, it may be freely turned clockwise by the operator to return the steering wheel, and thus the vehicle wheels, to the orientation shown in FIG. 3 for straight travel.

Figure 5:
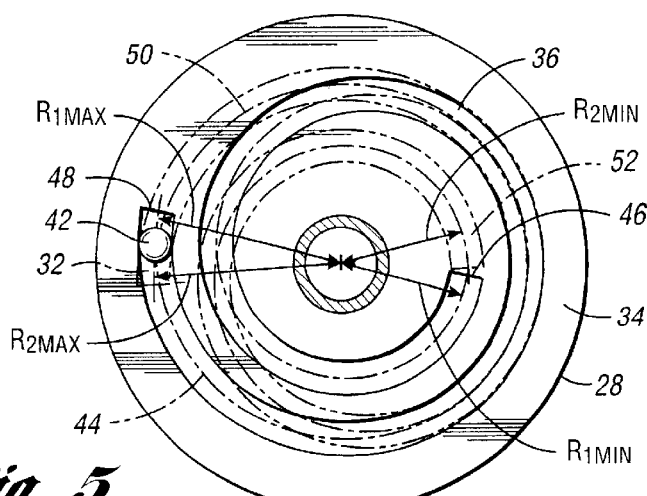
FIG. 5 is a plan view similar to FIG. 3 and depicts a right turn stop orientation.

Similarly, with the column oriented in the neutral position shown in FIG. 3, the operator executes a right turn by turning steering wheel 11 clockwise to rotate column 12. Sensor 16 detects the clockwise rotation of column 12 and generates an electrical signal to cause the vehicle wheels to pivot clockwise to alter the direction of the vehicle for a right turn. Rotation of column 12 rotates plate 26 relative to plate 28 and changes the location of the intersection whereat tracks 32 and 36 overlap. Sliding element 42 slides along the tracks 32 and 36, to remain located at the intersection. Continued rotation of the steering wheel is permitted by the operator until the plates are arranged as shown in FIG. 5. In this orientation, sliding element 42 is trapped between the outboard end 48 of track 32 and the outboard end 54 of track 36 and is stopped from sliding further along the tracks. In this manner, column 12 is prevented from further clockwise rotation, and the operator is prevented from further clockwise turning of the steering wheel. Thus, the arrangement shown in FIG. 4 corresponds to a second stop indicative of an extreme right turn rotation of the steering wheel. While the steering wheel is stopped from further clockwise rotation, it may be freely turned by the operator counterclockwise to return the steering wheels, and thus the vehicle wheels, to the orientation shown in FIG. 3 for straight travel.

The total rotation available to the vehicle operator ranging from the left-turn stop position shown in FIG. 4 to the right-turn stop position shown in FIG. 5 is approximately 1080 degrees. Thus, the present invention enables the operator to rotate the steering wheel more than 360 degrees from the neutral position in each direction, clockwise or counterclockwise, corresponding to a total angular displacement of more than 720 degrees between the first and second stops.

In alternative embodiments of the present invention, the width of track 32 and track 36 may be varied for simulating the feedback torque normally encountered in a mechanically-coupled steering system. By increasing or decreasing the width of the spiral track, an engineer may decrease or increase the friction encountered by the sliding element 42 such that the operator encounters resistance at points throughout the turning process. Although the preferred embodiment describes track 32 and track 36 as helicoids, and more preferably as Archimedean spirals, alternatively the shape of tracks may be elliptical or parabolic spirals. Moreover, although the preferred embodiment depicts track 32 and track 36 as grooves between which a spherical sliding element is disposed, in an alternative embodiment the tracks are slots that extend through the plates, and the sliding element may be a cylindrical pin axially disposed at the intersection of the slots.

Thus, this invention provides a steering column assembly that allows an operator to freely rotate the steering wheel for steering the vehicle, yet prevents further rotation of the steering wheel when further rotation is not desired or effective. This is accomplished by mechanical stops which provide feedback to the operator and protect against damage to other components of the column assembly that might otherwise be caused by oversteering. The compact design and minimal number of elements of the increase the utility of the space within the vehicle. It is preferred to locate the mechanical stops such that they correspond to the positions of pivot limits of the vehicle wheels so as to indicate the minimum turning radius of the vehicle. Optionally, the mechanical stops may be located such that they are encountered prior to the vehicle attaining its minimum turning radius to warn the operator that the minimum turning radius is approaching. Alternatively, the mechanical stops may be located such that they are encountered subsequent to the vehicle attaining its minimum turning radius to simulate sensations in the operator that correspond to driving a mechanically coupled vehicle. Nevertheless, the simple design of the present invention is easy to maintain and provides valuable driving feedback to operators of vehicles that utilize steer-by-wire steering systems.

While in the preferred embodiment, this invention has been described for use in a steer-by-wire system in an automotive vehicle, it is also suitable for use in automotive vehicles equipped with mechanically coupled steering systems to limit rotation of the steering column without reliance upon the vehicle wheels. Furthermore, it may also be employed in driving simulators of the type that utilize a steering column to provide input to a computer program that replicates driving experience.

As any person skilled in the art will recognize from the previous detailed description and from the figures and claims, modifications and changes can be made to the preferred embodiment of the invention without departing from the scope of this invention as defined in the following claims.

What is claimed is:

1. A turn-limited column assembly comprising
a column rotatable about an axis,
a first plate rotatable with the column, said first plate defining a first spiral track having an inboard end and an outboard end,
a second plate disposed to permit rotation of the first plate relative to the second plate, said second plate defining a second spiral track having an inboard end and an outboard end and arranged with the first plate such that a section of the first track axially overlies a section of the second spiral track to define an intersection, and further such that the first spiral track extends from the intersection toward the first track inboard end in a first direction and the second spiral track extends from the intersection toward the second track inboard end in a second direction different from the first direction, and
a sliding element disposed at the intersection and slideable along the first track and the second track between a first stop wherein the sliding element is disposed at the inboard end of the first track and the inboard end of the second track and a second stop wherein the sliding element is disposed at the outboard end of the first track and the outboard end of the second track.

2. The turn-limited column assembly of claim 1 wherein the first spiral track is a helicoid, and the second spiral track is a helicoid identical to the first spiral track and oriented to face the first spiral track.

3. The turn-limited column assembly of claim 1 wherein said first and second spiral tracks are Archimedean spirals oriented to face the first spiral track.

4. The turn-limited column assembly of claim 1 wherein the first spiral track extends over an angle greater than 360 degrees.

5. The turn-limited column assembly of claim 1 wherein the rotation of the column between the first stop and the second stop is greater than 720 degrees.

6. A steering column assembly comprising
a steering column rotatable about an axis,
a rotatable plate affixed to the steering column, said rotatable plate defining a first spiral track, said first spiral track being a helicoid about the axis and comprising an inboard end disposed at an inner radius and an outboard end disposed at an outer radius,
a fixed plate supported about the column to permit rotation of the rotatable plate relative to the fixed plate, said fixed plate defining a second spiral track, said second spiral track being a helicoid about the axis and comprising an inboard end disposed at an inner radius and an outboard end disposed at an outer radius, said first track having section that coaxially aligns with a section of the second track to define an intersection such that the first spiral track extends from the intersection toward the first track inboard end in a first direction and the second spiral track extends from the intersection toward the second track inboard end in a second direction different from the first direction, and
a sliding element disposed at the intersection and slideable along the first track and the second track,
said sliding element cooperating with the first track and the second track to permit rotation of the steering column between a first stop wherein the sliding element is disposed at the inboard end of the first track and the inboard end of the second track and a second stop wherein the sliding element is disposed at the outboard end of the first track and the outboard end of the second track.

7. The steering column assembly of claim 6 wherein the first track extends about the axis between the inboard end and the outboard end over an angle greater than 360 degrees.

8. The steering column assembly of claim 6 wherein the first track extends about the axis between the inboard end and the outboard end over an angle greater than 360 degrees.

9. The steering column assembly of claim 6 wherein a total angular displacement of the column between the first stop and the second stop is greater than 720 degrees.

10. A steering column assembly for an automotive vehicle having a steer-by-wire steering system, said steering column comprising a steering column rotatable about an axis having one end, and including a steering wheel disposed at said one end, an angle sensor operatively coupled to the steering column for providing an electrical signal indicative of a turn instruction corresponding to an operator turning the steering wheel, a rotatable plate affixed to the steering column and comprising a surface that defines a first spiral grooved track, said first spiral grooved track being a helicoid about the axis and comprising an inboard end disposed at an inner radius and an outboard end disposed at an outer radius, a fixed plate fixed about the column, said fixed plate having a surface facing the surface of the rotatable plate and defining a second spiral grooved track, said second spiral track being a helicoid about the axis and comprising an inboard end disposed at an inner radius and an outboard end disposed at an outer radius, said first track having a section that coaxially aligns with a section of the second track to define an intersection such that the first spiral track extends from the intersection toward the first track inboard end in a first direction and the second spiral track extends from the intersection toward the second track inboard end in a second direction different from the first direction, and a ball bearing disposed at the intersection and slideable along the first track and the second track, said ball bearing cooperating with the first track and the second track to permit rotation of the steering column between a first stop wherein the ball bearing is disposed between the inboard end of the first track and the inboard end of the second track and a second stop wherein the ball bearing is disposed between the outboard end of the first track and the outboard end of the second track.

11. The steering column assembly of claim 10 further comprising a bearing assembly interposed between the rotatable plate and the fixed plate.

* * * * *